Figure 1:
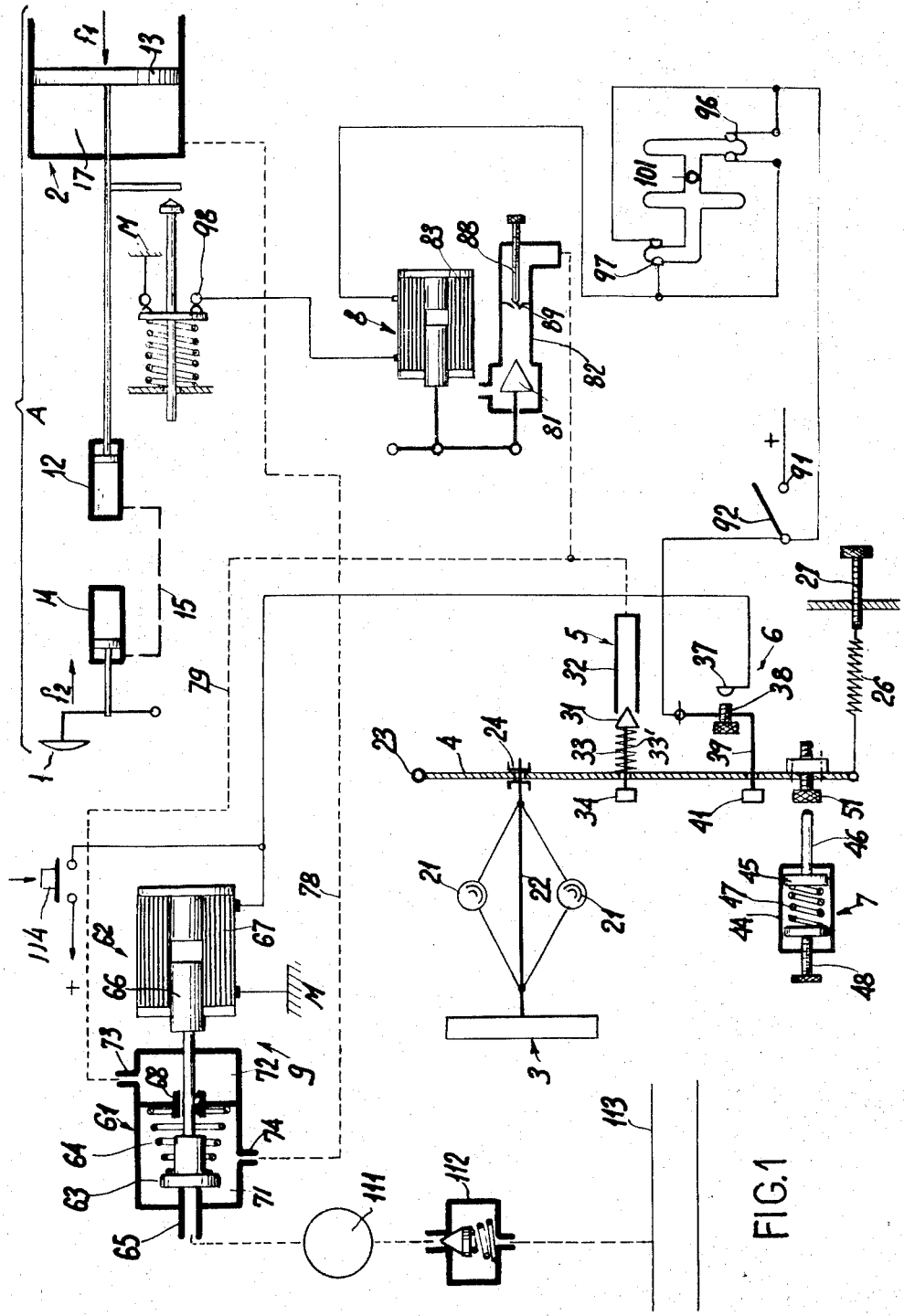

United States Patent
Wheymann

[15] 3,684,071
[45] Aug. 15, 1972

[54] CLUTCH CONTROLLED BY ENGINE SPEED AND TRANSMISSION SELECTOR

[72] Inventor: Charles Terres Wheymann, 13 rue Galvani, 75 Paris 17 eme, France

[22] Filed: Jan. 29, 1970

[21] Appl. No.: 6,704

[30] Foreign Application Priority Data

Feb. 3, 1969 France......................6902249

[52] U.S. Cl. ............192/3.58, 192/3.59, 192/91, 192/105 F, 60/54.5 R, 60/60
[51] Int. Cl. ..............................................B60k 21/00
[58] Field of Search ..........192/91, 3.58, 3.59, 103 F, 192/105 F

[56] References Cited

UNITED STATES PATENTS

| | | |
|---|---|---|
| 2,626,691 | 1/1953 | Price....................192/3.58 X |
| 2,631,700 | 3/1953 | Long et al.............192/3.59 X |
| 2,975,875 | 3/1961 | Edelblut..................192/91 X |
| 2,983,346 | 5/1961 | Weymann...............192/91 X |

Primary Examiner—Benjamin W. Wyche
Attorney—Jacobi, Lilling & Seigel

[57] ABSTRACT

A clutch control device for motor vehicles includes a declutching device, an engine speed sensor, and an arrangement of solenoid valves and electrical contactors in the electrical supply to these solenoid valves, the operation of the valves and hence the declutching device being governed by the speed sensor.

13 Claims, 2 Drawing Figures

3,684,071

CLUTCH CONTROLLED BY ENGINE SPEED AND TRANSMISSION SELECTOR

The present invention concerns improvements in or relating to automatic clutch control device for motor vehicles.

Already known are automatic clutch control systems but, generally, the known systems require important modifications to certain components in the vehicle or else provide results which are inadequate in comparison with non-automatic clutches.

An object of the present invention is to provide an automatic clutch control device which can be used on motor vehicles and lorries and, in particular, in vehicles which are equipped with a standard mechanical gearbox or one with automatic control.

A further object is to provide a control device which can be installed easily without modification to the vehicle being necessary, not only during assembly of the vehicle, but also after assembly.

Another object is to provide a control device including means for easy adjustment which do not affect one another and so make it possible to adapt accurately the clutch engagement and disengagement characteristics to the tastes and requirements of every driver.

A still further object is to provide a control device which leaves intact the standard control of the clutch by foot, which gives complete safety of operation.

An automatic clutch control device according to the present invention comprises a declutching control piston and cylinder device actuable on a component of the clutch engagement device of the vehicle and is operated by a fluid at a pressure different from a reference pressure, an engine speed sensor including a control element movable against the action of an adjustable spring, a valve for switching to the reference pressure operated by the moving control element of the sensor so that it opens in response to an increase in the speed of the engine upon attainment of a predetermined speed of same, an electrical contactor operated by the moving control element so that it opens in response to an increase in the speed of the engine upon attainment of a speed at most equal to the abovementioned predetermined speed, a clutch engagement electro-valve whose outlet opening is connected with the reference pressure when it is not activated, the coil of this electro-valve being powered by an electrical circuit which contains a contact which closes after completion of the predetermined travel of the piston of said declutch device, in the direction of clutch engagement, and a declutch electro-valve controlled by the said electrical contactor and linked to a source of pressure different from the reference pressure in order to connect the declutch control device, selectively, to said source or else to the reference pressure through the valve for switching to the reference pressure or the clutch engagement electro-valve.

Figure 2:
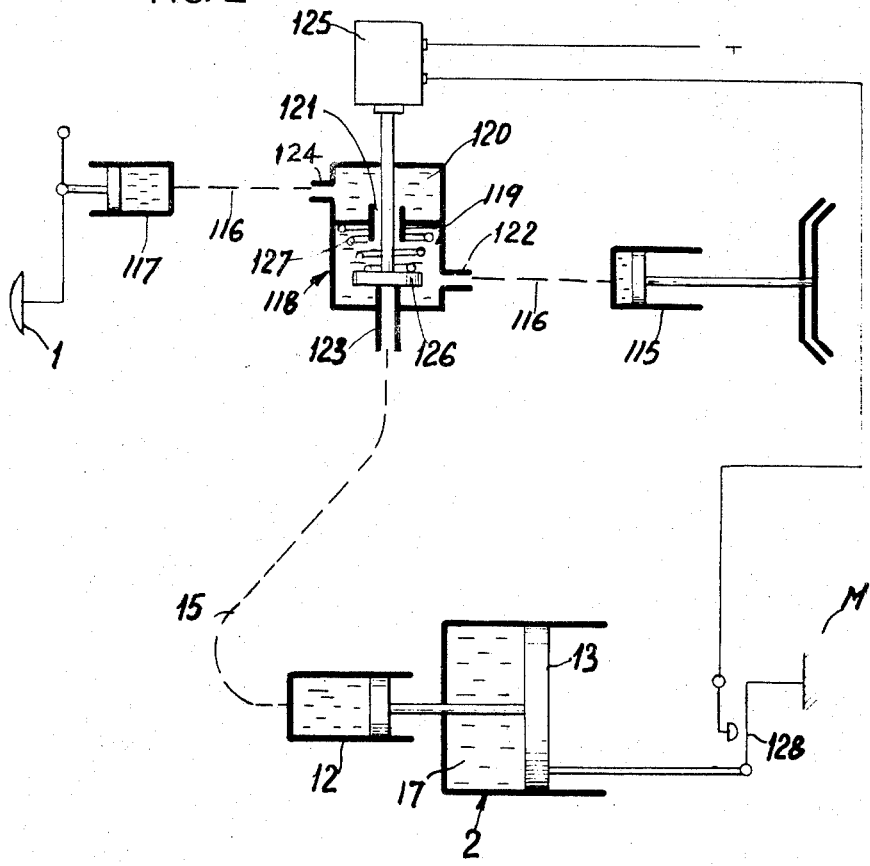

One embodiment of the present invention will now be described by way of example with reference to the accompanying drawings in which:

FIG. 1 is a schematic view of a control device for a pneumatically operated or vacuum clutch, and FIG. 2 shows a variation of the upper part of FIG. 1 marked A, this variation being used when the vehicle in question is equipped with a hydraulic control between the clutch pedal and the clutch.

In the automatic clutch installation shown in FIG. 1, reference number 1 designates a standard clutch pedal of a motor vehicle. The installation comprises basically a piston and cylinder device 2, the cylinder of which is at a pressure less than atmospheric, or vacuum and which controls declutching, activated by pedal 1, a device designated by 3, and which, for reasons of convenience, will hereinafter be called the regulator, but which, in reality is a speed sensor, that is a device sensitive to the rotation speed of the engine and which comprises a moving control element 4 whose position is a function of the speed of the engine at any moment, an air return valve 5, an electrical contactor 6, a modulator 7, a clutch-engagement electro-valve 8 and an electro-valve 9 for declutching.

The connection between the under-pressure vacuum piston and cylinder device 2 and pedal 1 is effected by an hydraulic transmission comprising a piston and cylinder device 12 whose piston is linked mechanically to the piston 13 of the device 2 and a piston and cylinder device 14 whose piston is linked mechanically to the pedal 1; the cylinders of the two devices 12 and 14 being linked by a pipe 15. A vacuum in the cylinder 17 of the cylinder device 2 causes movement of the piston 13 in the direction of arrow f1 and, as a result, movement in the same direction by the moving element of the device 12 so that the moving element of the other device 14 moves in the direction of the arrow f2 and so ensures depression of the pedal 1, which ensures uncoupling of the engine from the gearbox of the vehicle.

The regulator 3 contains a system with balls 21 carried on an axis 22 linked to the drive shaft of the vehicle engine. The control element 4 comprises a lever which can pivot on a fixed axis 23 and includes one part in the form of a fork enclosing a sleeve 24 which slides on the shaft 22 when the balls 21 approach or retract from said shaft. The balls 21 are urged towards the shaft 22 by a spring 26, one end of which is attached to the lever 4 and the other end to a screw 27 mounted in the casing of the regulator 3 and by means of which it is possible to regulate, as desired, the tension of the spring 26. The control element 4 of the regulator also operates the air return valve 5, the electrical contactor 6 and the modulator 7. The air return valve 5, shown schematically in the form of a needle 31 which cooperates with a seat formed by a free end of a tube 32, is linked to the lever 4 so that the valve 31 opens progressively depending on the speed of rotation of the regulator. To this end a rod 33 is attached to the needle 31, the rod freely passing through the lever 4 and being equipped with a head 34 whose position can be adjusted and against the inner face of which said lever comes to rest upon attainment of a certain speed of rotation of the regulator. For engine rotation speeds lower than a predetermined value, and as long as the play between the lever 4 and the head 34 is not taken up by displacement of the lever 4, the valve 31 remains pressed on to its seat by a spring 33'.

The electrical contactor 6 is also designed so that it opens upon reaching a certain regulator speed. The contactor has a fixed contact 37 in conjunction with which operates a moving contact 38 linked to the lever 4 of the regulator through a rod 39 which freely passes through a hole in the lever 4 and which is also equipped with a head 41 whose position can be adjusted and whose inner face is contacted by the lever 4 upon attainment of a certain speed of rotation of the regulator.

The modulator 7 comprises a case 44 into which can slide a piston 45 having a push-rod 46 formed integrally therewith. The pressure on piston 45 due to a spring 47 can be regulated by means of a regulating screw 48. The push-rod 46 can be thrust back by the lever 4 of the regulator through the intermediary of an adjustable bearing stop 51 comprising, for example, the head of a screw mounted in said lever. The more this stop is screwed into the lever 4 the more is delayed the moment when the modulator exerts resistance to the spreading of the balls 21 of the regulator. By screwing or unscrewing the screw 48 one regulates the intensity of this resistance.

The declutching electro-valve 9 comprises the valve proper 61 and its electro-magnetic control device 62 with a plunger core 66, for example. The valve 61 contains a check-valve 63 urged by a spring 64, against a seat formed by the inside end of a tube 65. The check valve 63 can move, under the action of its electro-magnetic control system 62, when the coil of this latter is activated, to press against another seat 68 which separates the chamber 71, in which is located the check-valve 63, from another chamber 72 for communicating with the atmosphere by way of an opening 73. The chamber 71 is equipped with a pipe 74 linked to the vacuum piston and cylinder device 2. This electro-valve is therefore three-way and makes is possible to link the pipe 74, that is the device 2, selectively to the vacuum pipe 65 or the opening 73.

The clutch-engagement electro-valve 8 is shown schematically in the form of a needle valve 81 whose seat is formed by the end of a tube 82 fitted with a throttle opening 89, adjustable, for example, by means of a pointed screw 88. This electro-valve is closed when the coil of its electro-magnetic control system 83 is activated.

The coil 67 of the declutching electro-valve 9 is connected electrically between ground M and a current source 91 through a switch 92 and the electrical contactor 6.

The coil 83 of the clutch-engagement electro-valve 8 is also connected electrically to the switch 92 but through one or other of two electrical contacts 96,97 as well as through an electrical contact 98 controlled by the piston 13 of the vacuum piston and cylinder device 2, or by any other element of the declutching mechanism. The electrical contacts 96, 97 are closed when the gear-change lever 101 is in the first gear position or for reverse respectively. Contact 98 is opened when the clutch is fully disengaged and closed when the clutch is engaged, the closing of this contact taking place at an intermediate point, which can be regulated, during the clutch engagement travel.

The vacuum supply tube 65 in the declutching electro-valve 9 is linked to a tank 111 itself linked through a check-valve 112 to the engine inlet manifold 113.

The operation of the automatic clutch installation is as follows:

Below a predetermined speed of the vehicle engine and therefore the shaft 22 of the regulator 3, the control element 4 of said regulator closes the electrical contactor 6 and the declutching electro-valve 9 is therefore activated by the following circuit: source 91, source 92, closed contactor 6, coil 67 and earth M. The cylinder of the vacuum device 2 is thus connected with the vacuum source 111 through the pipe 78, the pipe 74, the chamber 71 and the pipe 65 of the electro-valve 61. The piston 13 of the vacuum device 2 moves in the direction of the arrow f1 and produces as a result the depression of the declutch pedal in the direction of the arrow f2. The clutch is now disengaged.

If first gear is engaged, either manually or by an automatic control, the gear-change lever 101 closes the electrical contact 96 and if the driver presses down the accelerator the speed of the engine and as a result that of the shaft 22 of the regulator increases, the electrical contact 6 opens, the declutching electro-valve 9 is deactivated and its link to the vacuum source 111 is interrupted by the seating of valve 63 on its seat 65, whilst the chamber 17 of the vacuum device 2 is connected to the atmosphere by the pipe 78, the chamber 71 of the declutching electro-valve 9, the chamber 72 of same, the pipe 79 and, on one hand, the clutch-engagement electro-valve 8 which is open as the electrical contact 98 is open and, on the other hand, the air return valve 5 opened by the regulator.

The piston 13 of the vacuum device 2 moves rapidly in the opposite direction to that of the arrow f1, that is in the direction of clutch-engagement until it effects closing of the electrical contact 98. A conventional clutch-engaging spring will be used to move the piston 13 in a direction opposite to the arrow f1 and may be connected by conventional linkage (not shown) to the clutch for releasing same. The clutch-engagement electro-valve 8 closes so that the air which enters the vacuum device 2 cannot come from anywhere except the air return valve 5 whose cross-section is a function of the position of the control element 4 of the regulator. The position of this air return valve 5 is therefore a function of the speed of rotation of the centrifugal masses 21, the loading of the return spring 26 of these blocks as well as the point of intervention of the modulator 7 and the loading of its spring 47. If the engine once again slows down to below the minimum predetermined speed the declutching electro-valve 9 will once again come into action, as mentioned above.

The operation for starting up when reversing would be the same as the first forward gear but the contact 97 would replace the contact 96.

For the movement of the other gears the clutch-engagement electro-valve 8 is never activated and so stays wide open, for the clutch-engagement can then be carried out more quickly in view of the fact that the engine does not risk stalling.

In particular, the speed at which the valve 31 opens is low enough (for starting off in first gear and in reverse) for the valve 31 to be quite wide open at the moment of changing gear while moving (first-to-second; second-to-third, etc.) which permits rapid opening to the atmosphere of the device 2 and, as a result, quick clutch engagement.

Most often the possibilities for adjustments provided for in a control device and described above make it possible to obtain an adjustment satisfactory for starting off in first and reverse and also permitting re-engagement of the clutch in the other ratios without any perceptible slip. It is then useless to fit the contacts 96 and 97.

The declutch control can also be carried out manually by means of a push-button contact 114 which temporarily effects activation of the declutch electro-valve 9, engagement of the clutch then taking place in accordance with the process described above. The contacts corresponding to the push-button 114 can be accommodated in the gear-change lever so that the circuit is closed as soon as the lever is used.

Hereinafter will be described the effects produced by the adjustment means mentioned in connection with FIG. 1.

The return spring 26 enables adjustment of the travel of the lever 4 as a function of the engine speed.

The adjustable head 34 enables regulation of the moment in the travel of the lever 4 when the valve 31 begins to open.

The screw 51 of the modulator enables adjustment of the point at which the movements of the lever 4 as a function of the engine speed are decreased as a result of the intervention of the spring 47 being added to the spring 26 against the centrifugal force derived from the weights 21.

The adjustable head 41 enables regulation of the engine speed at which declutching takes place.

The screw 38 of the contactor 6 enables adjustment of the difference in speed between clutch engagement and disengagement especially in the case where the contactor is a microswitch with a sudden break.

The needle valve 88 enables adjustment of the air input into the electro-valve for declutching when the regulator is out of circuit, regulating the maximum speed for clutch engagement.

In the case where the clutch engagement control on a vehicle to be fitted as in the invention is a hydraulic control (FIG. 2) it is possible to use the original slave cylinder 115 by interposing in the pipe 116 between the original master-cylinder 117 and the slave cylinder 115 a three-way valve 118 which permits linking the receiver 115 either with the master cylinder 117 originally installed or with the master cylinder 12 of the automatic clutch control. This valve can be controlled by an electro-magnet or by an electro-valve. The valve itself can be constituted to advantage as shown by way of example in FIG. 2 where it comprises a cylinder 119 linking with a cylinder 120 through an opening 121, with the original slave cylinder by an opening 122, with the master cylinder 12 of the automatic device by an opening 123. The cylinder 120 is connected to the master cylinder 117 by conduit 116 extending through an opening 124 in the cylinder 120. An electro-magnet 125 when it is activated, opens the opening 123 and closes the opening 121 by attracting the valve 126 which normally closes 123 under the action of a spring 127. The supply current to this electro-magnet passes through a contactor 128 controlled by the piston 13 of the device 2 which closes this contactor as soon as the piston 13 begins to move. In this way the coil of the electro-magnet is only supplied temporarily and not permanently. Moreover, the link between the original master cylinder and the original slave cylinder is always maintained, which always makes it possible to declutch with the clutch pedal if necessary as in the case of FIG. 1.

In a modified device the pressure differential across the cylinder of the device 2 may be obtained by supplying compressed air to one side of the piston. This modification is convenient in, for example, lorries having a compressed air braking system.

When the invention described above a clutch control device is obtained which has the advantage that it can be easily installed without modification to any kind of vehicle, not only when the vehicle is being assembled but also on vehicles in operation.

In addition the control device comprises several means for easy adjustment which do not affect one another and so make it possible to adapt accurately the clutch engagement and disengagement characteristics to the tastes and requirements of every driver.

Finally the device described leaves intact the standard control of the clutch by foot, which gives complete safety of operation.

Naturally the invention is in no way limited to what has been described and shown; in particular the fluid circuits supplied at vacuum pressures could also be supplied by a pneumatic or hydraulic fluid at pressures above atmospheric.

I claim:

1. In a motor vehicle of the type having a change speed gear, a friction clutch, and a source of fluid under pressure different from atmospheric pressure, an automatic clutch operating system comprising: a cylinder having a piston therein operably connected to the clutch said piston moveable in a clutch engaging and clutch disengaging direction; means providing a fluid flow connection between said cylinder and the source; a first valve disposed in said connection means and positionable to connect said cylinder either to said source or to a first conduit leading to the atmosphere; a second valve disposed in said first conduit for controlling the rate of flow therethrough; a second conduit connected to said first conduit and leading to atmosphere; adjustable flow restricting means in said second conduit; a third valve disposed in said second conduit and movable between an open position for allowing the passage of fluid through said second conduit and a closed position for preventing said passage; a first electromagnet operatively associated with said first valve and adapted, when energized, to move said first valve to a position in which said cylinder is connected to said source so as to cause disengagement of said clutch; a second electromagnet operatively associated with said third valve and adapted, when energized, to move said third valve to said closed position thereof; first electrical circuit means for operating said first electromagnet comprising a first switch for controlling energization and deenergization of said first electromagnet; second electrical circuit means for operating said second electromagnet comprising a second switch for controlling energization and deenergization of said second electromagnet; means movable in unison with said piston and positioned so as to engage said second switch to thereby open said second circuit means and deenergize said second electromagnet as said piston moves in said clutch disengaging direction; a motor speed responsive control element means movable between two positions one of which corresponds to a predetermined minimum motor speed and the other to a maximum motor speed; first actuator means for said first switch; second actuator means for said second valve, said first and second actuator means being associated with said control element means so as to open said first switch and thereby deenergize said first electromagnet, and so as to open said second valve to an extent corresponding to the speed of said motor above said minimum speed, upon movement of said control element means away from said one position thereof.

2. An automatic clutch operating system as recited in claim 1, further comprising adjustable resilient means for exerting increasing pressure as said control element means moves from said first position to said second position.

3. An automatic clutch operating system as recited in claim 1, further comprising: a gear-shift member and a plurality of electrical contacts corresponding to the first and reverse position of said gear-shift member, said second circuit means being completed and said second electromagnet energized upon said gear-shift member being placed in said first or in said reverse position.

4. An automatic clutch operating system as recited in claim 1, further comprising hydraulic means for interconnecting said piston with said clutch pedal.

5. An automatic clutch control device for a motor vehicle having a change speed gear, a declutching control piston and cylinder device, and a source of fluid at a pressure different from a reference pressure, comprising: a clutch-engaging electro-valve (8), a declutching electro-valve (9), an engine speed sensor (3) including a pivotable control element (4) movable responsive to engine speed against the action of an adjustable spring (26); an air return valve (5) for switching to the reference pressure, said air return valve operable by needle valve means (31) mechanically coupled to said speed sensor so as to be directly operated thereby and responsive to a change in engine speed of an associated engine upon attainment of a predetermined speed of said engine; said clutch-engaging electro-valve (8) having a coil (83) and an outlet opening; said declutching electro-valve (9) being connected to a source of pressure different from the reference pressure for connection selectively to said different pressure source or to said reference pressure through said air return valve (5) or said clutch-engaging electro-valve (8); electrical contactor means (37, 38) operable upon the movement of said control element (4) so that it opens in response to an increase in the speed of the engine upon attainment of a speed at least equal to said predetermined engine speed, the coil of said electro-valve (8) being powered by an electrical circuit having contact means for closing said circuit upon a predetermined distance of travel of the piston of said declutching electro-valve (9) in the direction of clutch engagement.

6. An automatic clutch control device according to claim 5 further including a modulator comprising an elastic element of adjustable force adapted to exert an increasing pressure against said movable control element (4) of said engine speed sensor (3) upon attainment of said predetermined engine speed.

7. An automatic clutch control device according to claim 5, in which the reference pressure is atmospheric pressure.

8. An automatic clutch control device according to claim 7 in which the cylinder of the declutching control device is connected to a source having a pressure below atmospheric.

9. An automatic clutch control device according to claim 8, in which said source is a reservoir connected to the inlet manifold of said engine through a check valve (112).

10. An automatic clutch control device according to claim 8, wherein the said de-clutching control device is connected to a source of compressed air.

11. An automatic clutch control device according to claim 5, wherein said electrical circuit includes two electrical switches connected to said change speed gear, one of said switches being closed when said change speed gear is in the reverse position and the other of said switches being closed when said change speed gear is in a first gear speed position.

12. An automatic clutch control device according to claim 5 further including a clutch pedal operatively connected to said de-clutching control device.

13. An automatic clutch control device according to claim 12, further including two interconnected hydraulic cylinders connecting said clutch pedal and said declutching control device.

* * * * *

UNITED STATES PATENT OFFICE
CERTIFICATE OF CORRECTION

Patent No. 3,684,071     Dated August 15, 1972

Inventor(s) Charles Terres Weymann

It is certified that error appears in the above-identified patent and that said Letters Patent are hereby corrected as shown below:

On the first or front page of this patent in the left hand column under the paragraph entitled "Inventor", the surname of the inventor should be corrected by changing it from "Wheymann" to -- Weymann --.

Signed and sealed this 6th day of February 1973.

(SEAL)
Attest:

EDWARD M. FLETCHER, JR.
Attesting Officer

ROBERT GOTTSCHALK
Commissioner of Patents